United States Patent
Alouhali et al.

(10) Patent No.: US 10,724,327 B1
(45) Date of Patent: Jul. 28, 2020

(54) SPHERE-SHAPED LOST CIRCULATION MATERIAL (LCM) HAVING HOOKS AND LATCHES

(71) Applicant: Saudi Arabian Oil Company, Dhahran (SA)

(72) Inventors: Raed A. Alouhali, Dhahran (SA); Eric Moellendick, Dhahran (SA); Md Amanullah, Dhahran (SA); Mohammed Arfaj, Dhahran (SA); Mohammed Al Rashead, Dammam (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 16/561,927

(22) Filed: Sep. 5, 2019

(51) Int. Cl.
*E21B 33/13* (2006.01)
*E21B 21/08* (2006.01)
*E21B 21/00* (2006.01)

(52) U.S. Cl.
CPC ............ *E21B 33/13* (2013.01); *E21B 21/003* (2013.01); *E21B 21/08* (2013.01)

(58) Field of Classification Search
None
See application file for complete search history.

(56) References Cited

U.S. PATENT DOCUMENTS

| | | | |
|---|---|---|---|
| 8,607,895 B2 | 12/2013 | Hoskins | |
| 9,284,798 B2 | 3/2016 | Jamison et al. | |
| 9,322,260 B2 | 4/2016 | Potapenko et al. | |
| 9,587,158 B2 | 3/2017 | Livanec et al. | |
| 2013/0244910 A1* | 9/2013 | Livanec | C09K 8/03 507/104 |
| 2013/0284518 A1 | 10/2013 | Wu et al. | |
| 2014/0216743 A1* | 8/2014 | Gaudette | C09K 8/426 166/285 |
| 2014/0231082 A1* | 8/2014 | Jamison | E21B 21/003 166/278 |
| 2016/0084022 A1 | 3/2016 | Snoswell | |
| 2016/0137903 A1* | 5/2016 | Friedheim | C09K 8/516 166/285 |
| 2016/0237767 A1 | 8/2016 | Snoswell et al. | |
| 2016/0244654 A1 | 8/2016 | Way et al. | |
| 2016/0312102 A1* | 10/2016 | Whitfill | E21B 33/138 |
| 2017/0253788 A1 | 9/2017 | Ivanov et al. | |

FOREIGN PATENT DOCUMENTS

GB 2518441 A 3/2015

* cited by examiner

*Primary Examiner* — Anuradha Ahuja
(74) *Attorney, Agent, or Firm* — Bracewell LLP; Constance G. Rhebergen; Brian H. Tompkins

(57) ABSTRACT

A lost circulation material (LCM) that includes spheres having radially distributed hooks and latches to facilitate engagement (such as interlocking) of the spheres is provided. Each sphere has a plurality of hooks and a plurality of latches to engage latches and hooks respectively of adjacent spheres. Each hook may include two hook arms, and each latch may define an aperture to receive a hook arm. The spheres may form plugs in channels, fractures, and other openings in a lost circulation zone. Additionally or alternatively, the spheres may form a bridge on which other LCMs may accumulate to seal openings in a lost circulation zone. Methods of preventing lost circulation using the spheres are also provided.

13 Claims, 2 Drawing Sheets

SPHERE-SHAPED LOST CIRCULATION MATERIAL (LCM) HAVING HOOKS AND LATCHES

BACKGROUND

Field of the Disclosure

The present disclosure generally relates to controlling lost circulation in a wellbore during drilling with a drilling fluid. More specifically, embodiments of the disclosure relate to a lost circulation material (LCM).

Description of the Related Art

Lost circulation is one of the frequent challenges encountered during drilling operations. Lost circulation can be encountered during any stage of operations and occurs when drilling fluid (such as drilling mud) pumped into a well returns partially or does not return to the surface. While some fluid loss is expected, excessive fluid loss is not desirable from a safety, an economical, or an environmental point of view. Lost circulation is associated with problems with well control, borehole instability, pipe sticking, unsuccessful production tests, poor hydrocarbon production after well completion, and formation damage due to plugging of pores and pore throats by mud particles. In extreme cases, lost circulation problems may force abandonment of a well.

Lost circulation can occur in various formations, such as naturally fractured formations, cavernous formations, and highly permeable formations (for example, "super-K" formations having a permeability greater than 500 millidarcy). Lost circulation can be categorized by the amount of fluid or mud lost as seepage type, moderate type, severe type, and total loss. The extent of the fluid loss and the ability to control the lost circulation with an LCM depends on the type of formation in which the lost circulation occurs.

SUMMARY

Lost circulation materials (LCMs), also referred to as loss control materials are used to mitigate the lost circulation by blocking the path of the drilling fluid (such as drilling mud) into the formation. Many existing LCMs include naturally-occurring or shaped materials that may have spherical, fibrous, or flaky shapes to block fractures, channels, and other openings in lost circulation zones. However, naturally-occurring or shaped materials may not have the optimal shapes for forming bridges or plugs in fractures, channels, and other openings in lost circulation zones to achieve a desired lost circulation performance.

Additionally, naturally-occurring or shaped materials may also suffer from insufficient mechanical strength, chemical resistance, thermal stability, and biological degradation. Consequently, existing LCMs formed from naturally-occurring or shaped materials may perform poorly at downhole conditions and may not seal and block lost circulation zones for sufficient time periods.

Many naturally-occurring or shaped LCMs swell in exposure to liquids in a well. However, swellable LCMs may have various problems, including a risk of premature swelling which could plug a bottom hole assembly (BHA), drill pipe, or both. Swellable LCMs may also have a risk of late swelling such that an LCM is ineffective and does not swell in the lost circulation zone and is swept away before use.

Embodiments of the disclosure are directed to an LCM having a plurality of spheres such that each sphere has a plurality of radially distributed hooks and latches to facilitate engagement (such as interlocking) of the spheres. Advantageously, the spheres do not rely on swelling to form plugs or bridges in a lost circulation zone. The spheres may form improved and more effective plugs as compared to natural LCM products. Further, the spheres may form bridges in the lost circulation zone to enable the accumulation of an additional LCM for improved sealing of the lost circulation zone.

In one embodiment, a method to control lost circulation in a lost circulation zone in a wellbore is provided. The method includes introducing an altered carrier fluid into the wellbore such that the altered carrier fluid contacts the lost circulation zone, such that the altered carrier fluid includes a carrier fluid and a lost circulation material (LCM). The LCM includes a plurality of spheres. Each sphere includes a sphere body and a plurality of hooks, each hook extending outward from a surface of the sphere body and having a first hook arm and a second hook arm, the second hook arm extending in a direction opposite the first hook arm. Each sphere also includes a plurality of latches, each latch extending outward from the surface of the sphere body and having an aperture. A hook of a sphere of the plurality of spheres is configured to engage a latch of an adjacent sphere via insertion of a first hook arm or a second hook arm through the aperture such that the plurality of spheres form a structure.

In some embodiments, the LCM consists of the plurality of spheres. In some embodiments, the carrier fluid is an oil-based drilling mud or a water-based drilling mud. In some embodiments, the LCM is a first LCM, such that the method includes introducing an altered drilling fluid into the wellbore such that the altered drilling fluid contacts the lost circulation zone and the altered drilling fluid includes a drilling fluid and a second LCM, such that the second LCM accumulates on the structure. In some embodiments, each sphere of the plurality of spheres has a diameter in the range of 5 millimeter to 38 mm. In some embodiments, the sphere body has a diameter in the range of 3 millimeters to 34 mm. In some embodiments, the plurality of hooks and the plurality of latches have an alternating pattern. In some embodiments, each hook of the plurality of hooks is separated from an adjacent latch of the plurality of latches by a radial distance in the range of 10° to 45°. In some embodiments, each hook of the plurality of hooks has a length and the sphere body has a diameter, such that the ratio of the length to the diameter is in the range of 0.1 to 3.5. In some embodiments, each latch of the plurality of latches has a length and the sphere body has a diameter, such that the ratio of the length to the diameter is in the range of 0.1 to 3.5. In some embodiments, introducing the altered carrier fluid into the wellbore includes pumping the altered carrier fluid through a drill bit. In some embodiments, introducing the altered carrier fluid into the wellbore includes using a bypass system. In some embodiments, introducing the altered carrier fluid into the wellbore includes introducing the altered carrier fluid into the wellbore using an open-ended drill pipe.

In another embodiment, a lost circulation material (LCM) composition is provided. The LCM includes a plurality of spheres. Each sphere includes a sphere body and a plurality of hooks, each hook extending outward from a surface of the sphere body and having a first hook arm and a second hook arm, the second hook arm extending in a direction opposite the first hook arm. Each sphere also includes a plurality of latches, each latch extending outward from the surface of the sphere body and having an aperture. A hook of a sphere of the plurality of spheres is configured to engage a latch of an adjacent sphere via insertion of a first hook arm or a second hook arm through the aperture such that the plurality of spheres form a structure.

In some embodiments, each sphere of the plurality of spheres has a diameter in the range of 5 millimeter to 38 mm. In some embodiments, the sphere body has a diameter in the range of 3 millimeters to 34 mm. In some embodiments, the plurality of hooks and the plurality of latches have an alternating pattern. In some embodiments, each hook of the plurality of hooks is separated from an adjacent latch of the plurality of latches by a radial distance in the range of 10° to 45°. In some embodiments, each hook of the plurality of hooks has a length and the sphere body has a diameter, such that the ratio of the length to the diameter is in the range of 0.1 to 3.5. In some embodiments, each latch of the plurality of latches has a length and the sphere body has a diameter, such that the ratio of the length to the diameter is in the range of 0.1 to 3.5.

In another embodiment, an altered drilling fluid is provided. The altered drilling fluid includes a drilling fluid and a plurality of spheres. Each sphere includes a sphere body and a plurality of hooks, each hook extending outward from a surface of the sphere body and having a first hook arm and a second hook arm, the second hook arm extending in a direction opposite the first hook arm. Each sphere also includes a plurality of latches, each latch extending outward from the surface of the sphere body and having an aperture. A hook of a sphere of the plurality of spheres is configured to engage a latch of an adjacent sphere via insertion of a first hook arm or a second hook arm through the aperture such that the plurality of spheres form a structure.

In some embodiments, each sphere of the plurality of spheres has a diameter in the range of 5 millimeter to 38 mm. In some embodiments, the sphere body has a diameter in the range of 3 millimeters to 34 mm. In some embodiments, the plurality of hooks and the plurality of latches have an alternating pattern. In some embodiments, each hook of the plurality of hooks is separated from an adjacent latch of the plurality of latches by a radial distance in the range of 10° to 45°. In some embodiments, each hook of the plurality of hooks has a length and the sphere body has a diameter, such that the ratio of the length to the diameter is in the range of 0.1 to 3.5. In some embodiments, each latch of the plurality of latches has a length and the sphere body has a diameter, such that the ratio of the length to the diameter is in the range of 0.1 to 3.5.

DETAILED DESCRIPTION

The present disclosure will be described more fully with reference to the accompanying drawings, which illustrate embodiments of the disclosure. This disclosure may, however, be embodied in many different forms and should not be construed as limited to the illustrated embodiments. Rather, these embodiments are provided so that this disclosure will be thorough and complete, and will fully convey the scope of the disclosure to those skilled in the art.

Embodiments of the disclosure include a lost circulation material (LCM) that includes spheres having radially distributed hooks and latches to facilitate engagement (such as interlocking) of the spheres to create a flow barrier in a lost circulation zone. The LCM may be referred to in the disclosure as a "hook and latch sphere LCM." In some embodiments, the spheres may form plugs in channels, fractures, gaps, and other openings in a lost circulation zone. In some embodiments, the spheres may form a bridge on which other LCMs may accumulate to seal and plug channels, fractures, gaps, and other openings in a lost circulation zone. In some embodiments, the hook and latch sphere LCM may be used to prevent seepage-type lost circulation (for example, lost circulation zones having openings of less than 1 millimeter (mm) in size) to severe-type lost circulation (for example, lost circulation zones having openings up to 114 mm in size).

Figure 1:
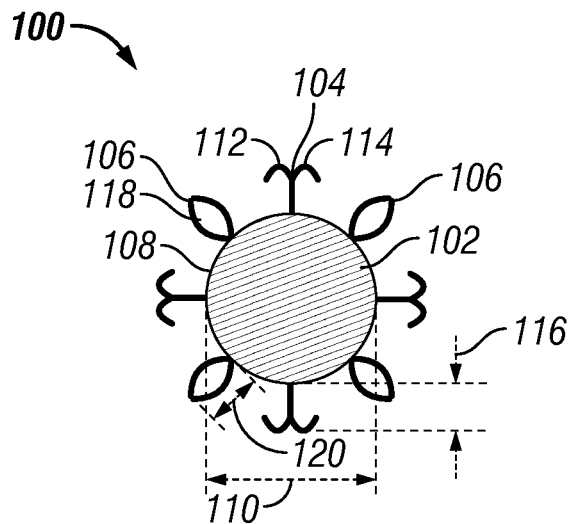
FIG. 1 is a 2-D schematic diagram of a sphere having hooks and latches for a lost circulation material in accordance with an embodiment of the present disclosure.

FIG. 1 is a two-dimensional (2-D) schematic diagram of a sphere 100 having a sphere body 102 and radially distributed hooks 104 and latches 106 extending from the surface 108 of the body 102 in accordance with an embodiment of the present disclosure. As shown in FIG. 1, the hooks 104 and latches 106 may be distributed in equally spaced radial directions around the circumference of the sphere body 102. In some embodiments, the hooks 104 and latches 106 may be in an alternating pattern. The sphere body 102 may have a diameter 110 in the range of 3 millimeters (mm) to 34 mm. The diameter of the sphere 100 with the radially distributed hooks 104 and latches 106 may be in the range of 5 mm to 38 mm.

Each hook 104 protrudes from the surface 108 of the sphere 100. The hook 104 may have a length 116 in the range of 4 mm to 10 mm. In the embodiment shown in FIG. 1, each hook 104 includes a first hook arm 112 and a second hook arm 114 in a symmetrical configuration. In some embodiments, each hook arm 112 and 114 may have a degree of curvature in the range of 15° to 45°. In other embodiments, the hook 104 may have three hook arms or four hook arms.

Each latch 106 may define an aperture 118 configured to receive an arm of a hook 104. The aperture 118 may be closed at each end, that is, the end nearest the surface 108 and the end farthest from the surface 108. In some embodiments, each aperture 118 may be generally oval-shaped, circular-shaped, or may form other shapes. In some embodiments, the width of the aperture 118 is proportional to the length of the latch 106. For example, each aperture 118 may have an aperture width to latch length ratio in the range of 1:0.25 to 1:2. In some embodiments, the aperture width to latch length ratio is 1:1. Each latch 104 may have a length 120 in the range of 4 mm to 10 mm.

The hooks 104 and latches 106 are distributed radially around the circumference of the sphere body 102 in equal directions. Each hook 104 and latch 106 may have a radial separation in the range of 10° for 45°. For example, for embodiments having an alternating pattern, each hook 104 may be separated from an adjacent latch 106 by a radial distance in the range of 10° for 45°. As will be appreciated, in some embodiments an increase in the diameter of the sphere body 102 may include a decrease in the radial spacing of the hooks 104 and latches 106, and a decrease in the diameter of the sphere body 102 may include an increase in the radial spacing of the hooks 104 and latches 106.

The sphere 100 may define a hook and latch length to sphere diameter ratio (referred to as "da/db" ratio). In some embodiments, the da/db ratio may in the range of 0.1 to 3.5. In some embodiments, the da/db ratio may vary based on the particular application or deployment technique used with the LCM. For example, a greater da/db ratio may be used to enable formation of a bridge from the spheres, such that additional LCMs may be introduced into the lost circulation zone to form seals or plugs on the bridge. In another example, a lesser da/db ratio may be used to enable formation of plugs from the spheres without the use of another LCM.

In some embodiments, the diameter of the sphere 100 having the hooks 104 and latches 106 may be selected based on the deployment technique used to deploy the LCM downhole to a lost circulation zone. In some embodiments, the LCM having the spheres 100 may be deployed through a drill bit. In such embodiments, the sphere 100 may have a diameter in the range of 5 mm to 8 mm. In some embodiments, an LCM having the spheres 100 may be deployed using a bypass system (that is, a system that enables bypassing the BHA to introduce the LCM into the wellbore); in such embodiments, the sphere 100 may have a diameter in the range of 9 mm to 14 mm. In some embodiments, an LCM having the spheres 100 may be deployed using an open ended drill pipe; in such embodiments, the sphere 100 may have a diameter in the range of 15 mm to 38 mm.

The sphere 100 may be formed from various materials that have thermal stability and resiliency. As used in the disclosure, the term "thermal stability" refers to stability of the material under downhole conditions (for example, temperature and pressure) in a well such that the material does not degrade or dissolve. As used in the disclosure, the term "resiliency" refers to a material that is capable of elastic deformation. For example, the hooks 104 and latches 106 of the sphere 100 may be of sufficient resiliency so that the hooks and latches do not break off from the sphere body 102 when the sphere 100 impacts formation rock in a lost circulation zone.

Figure 2:
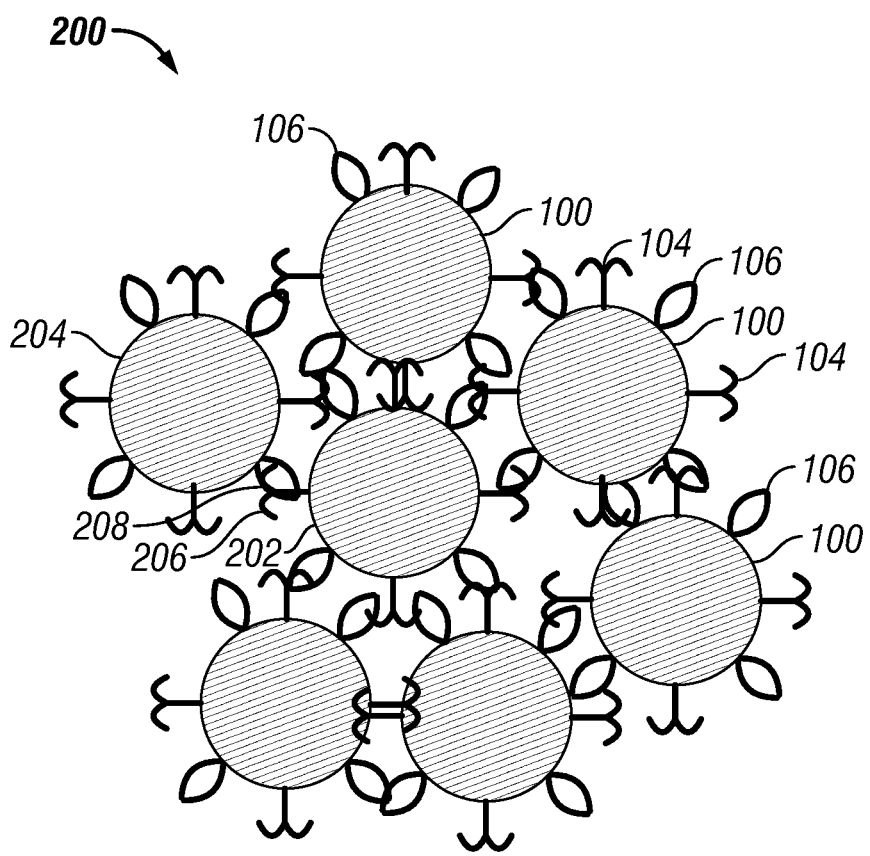
FIG. 2 is a 2-D schematic diagram of a structure (for example, a bridge of plug) formed by the spheres of FIG. 1 via engagement between the hooks and latches in accordance with an embodiment of the disclosure.

FIG. 2 is a 2-D schematic diagram of a structure 200 (for example, a bridge of plug) formed by the spheres 100 via engagement between the hooks 104 and latches 106 in accordance with an embodiment of the disclosure. In should be appreciated that although FIG. 2 is a 2-D depiction, the structure 200 formed by the spheres 100 is a three-dimensional (3-D) structure. As shown in FIG. 2 each arm of a hook 104 may engage an aperture of a latch 106 when a sphere is in sufficient proximity to another sphere. For example, with regard to labeled spheres 202 and 204, an arm of the hook 206 of sphere 202 may engage the aperture of latch 208 of adjacent sphere 204. In this manner, each sphere 100 may engage an adjacent sphere to form the structure 200 via engagement of a hook with a latch. Each sphere may engage with one, two, three, four, five six or more spheres to from the structure 200. Additionally, the spheres around the edges of the structure 200 may be available for engagement with additional spheres subsequently introduced into the lost circulation zone.

The structure 200 depicted in FIG. 2 may act as a bridge, a plug, or both. For example, in some embodiments, the structure 200 may provide a bridge for additional LCMs introduced into the lost circulation zone to form a seal or plug on the bridge. Additionally, or alternatively, the structure 200 may form a plug that reduces or prevents lost circulation in a lost circulation zone without the use of additional LCMs. In some embodiments, the spheres used for formation of a bridge may have a greater da/db ratio than the spheres used for formation of a plug.

In some embodiments, the sphere 100 may be a nonmetallic material, such as a polymer (for example, a plastic). In some embodiments, the sphere 100 is formed from a non-swellable material, such that the spheres are non-swellable in the presence of hydrocarbons or water. The material forming the sphere 100 may have a rigidity sufficient to enable engagement between a hook and latch under downhole conditions (such as temperature and pressure) without deformation that prevents such engagement.

In some embodiments, the sphere 100 may be produced using additive manufacturing (for example, 3-D printing). The sphere 100 may be produced using known 3-D printing techniques, such as direct ink writing (DIW), inkjet printing fused deposited modeling, or stereolithography, or other techniques. The printable material (for example, an ink) may include a nonmetallic composition having the thermal stability and resiliency mentioned in the disclosure.

In some embodiments, the sphere 100 may be produced using a mold to cast shredded rubber and a binder into the sphere 100. In some embodiments, the shredded rubber is shredded rubber from scrap tires (for example, magnetically separated crumb rubber). In some embodiments, the binder is polyurethane.

In some embodiments, the sphere 100 may be produced using a mold to cast a heat-resistant plastic (for example, a thermosetting polymer) into the sphere 100. In such embodiments, the sphere 100 may be produced using known plastic molding techniques, such as injection molding, or compression molding, or transfer molding, or other techniques.

Figure 3:
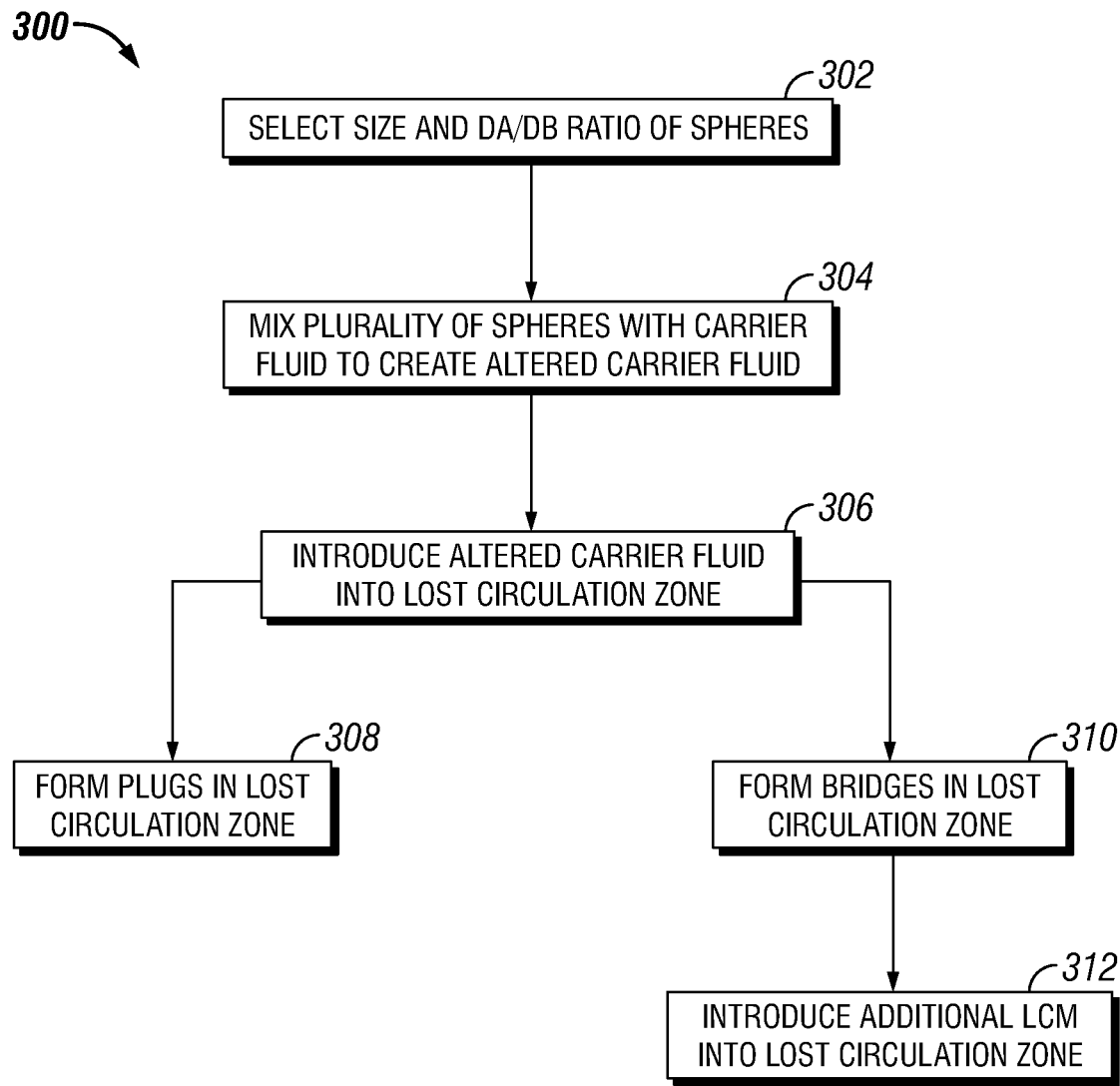
FIG. 3 is a block diagram of a process for the use of a hook and latch sphere lost circulation material (LCM) in accordance with an embodiment of the disclosure.

FIG. 3 depicts a process 300 for using the hook and latch sphere LCM in accordance with an embodiment of the disclosure. Initially, the size and da/db ratio of the spheres in the hook and latch sphere LCM may be selected (block 302). As discussed in the disclosure, the size and da/db ratio of the spheres may be based on the type of lost circulation and the deployment technique used to introduce the spheres into the lost circulation zone.

In some embodiments, an LCM having a plurality of the spheres may be added to carrier fluid to create an altered carrier fluid having the hook and latch sphere LCM for introduction into a lost circulation zone (block 304). For example, in some embodiments, the plurality of spheres may be added directly to a drilling fluid, such as a drilling mud, to create an altered drilling fluid having the hook and latch sphere LCM. For example, in some embodiments, the plurality of spheres may be added to (for example, mixed with) an oil-based drilling mud or a water-based drilling mud. In some embodiments, the hook and latch sphere LCM may be added at the mud pit of a mud system.

In some embodiments, the hook and latch sphere LCM may have a concentration in the range of 10 pounds-per-barrel (ppb) to 40 ppb in the carrier fluid. For example, at these concentrations, the carrier fluid may be pretreated to prevent or mitigate fluid loss. When loss circulation is encountered, the hook and latch sphere LCM may have a concentration in the range from 40 ppb to 200 ppb. As will be appreciated, such concentrations may be dependent on the mechanism of introduction into the lost circulation zone. For example, a concentration of about 40 ppb may be a concentration limit of a motor or other BHA. In another example, a concentration of about 200 ppb may be used with an open ended drill pipe.

The altered carrier fluid may then be introduced into a lost circulation zone (block 306). After addition of the hook and latch sphere LCM to a carrier fluid, the altered carrier fluid (for example, the altered drilling fluid) may be circulated at a pump rate effective to position the carrier fluid into contact with a lost circulation zone in a wellbore, such that the plurality of spheres alter the lost circulation zone (such as by forming a structure in paths, cracks, and fractures). In some embodiments, the hook and latch sphere LCM may be introduced to the lost circulation zone through a drill bit. In some embodiments, the hook and latch sphere LCM may be introduced to the lost circulation zone using a bypass system. In some embodiments, the hook and latch sphere LCM may be introduced to the lost circulation zone using an open ended drill pipe.

In some embodiments, the hook and latch LCM may be used to form plugs in paths, cracks, and fractures in a formation in the lost circulation zone (block 308). In such embodiments, after introducing the hook and latch LCM into the lost circulation zone, drilling operations may resume with a reduced rate of lost circulation of the drilling fluid.

In some embodiments, the hook and latch LCM may be used to form bridges in paths, cracks, and fractures in a formation in the lost circulation zone (block 310). In such embodiments, an additional LCM may be introduced into the lost circulation zone (block 312), such as via an altered drilling fluid having the additional LCM. The additional LCM may accumulate on the bridges formed by the hook and latch LCM to seal or plug the lost circulation zone. After introducing the additional LCM into the lost circulation zone, drilling operations may resume with a reduced rate of lost circulation of the drilling fluid.

Ranges may be expressed in the disclosure as from about one particular value, to about another particular value, or both. When such a range is expressed, it is to be understood that another embodiment is from the one particular value, to the other particular value, or both, along with all combinations within said range.

Further modifications and alternative embodiments of various aspects of the disclosure will be apparent to those skilled in the art in view of this description. Accordingly, this description is to be construed as illustrative only and is for the purpose of teaching those skilled in the art the general manner of carrying out the embodiments described in the disclosure. It is to be understood that the forms shown and described in the disclosure are to be taken as examples of embodiments. Elements and materials may be substituted for those illustrated and described in the disclosure, parts and processes may be reversed or omitted, and certain features may be utilized independently, all as would be apparent to one skilled in the art after having the benefit of this description. Changes may be made in the elements described in the disclosure without departing from the spirit and scope of the disclosure as described in the following claims. Headings used in the disclosure are for organizational purposes only and are not meant to be used to limit the scope of the description.

What is claimed is:

1. A method to control lost circulation in a lost circulation zone in a wellbore, comprising:
   introducing an altered carrier fluid into the wellbore such that the altered carrier fluid contacts the lost circulation zone, wherein the altered carrier fluid comprises a carrier fluid and a lost circulation material (LCM), wherein the LCM comprises a plurality of spherical particles, each of the plurality of spherical particles comprising:
   a sphere body;
   a plurality of hooks, each of the hooks extending outward from a surface of the sphere body and comprising a first hook arm and a second hook arm extending in a direction opposite the first hook arm; and
   a plurality of latches, each of the latches extending outward from the surface of the sphere body and comprising an aperture,
   engaging at least a portion of the hooks with at least a portion of the latches on adjacent particles of the plurality of spherical particles to form a structure; and thereby reducing a rate of lost circulation;
   wherein the engaging comprises insertion of the first hook arm or the second hook arm of each of the engaged hooks through the aperture of one of the engaged latches.

2. The method of claim 1, wherein the LCM consists of the plurality of spherical particles.

3. The method of claim 1, wherein the carrier fluid comprises an oil-based drilling mud or a water-based drilling mud.

4. The method of claim 1, wherein the LCM comprises a first LCM, the method comprising:
   introducing an altered drilling fluid into the wellbore such that the altered drilling fluid contacts the lost circulation zone, wherein the altered drilling fluid comprises a drilling fluid and a second LCM, such that the second LCM accumulates on the structure.

5. The method of claim 1, wherein each particle of the plurality of spherical particles has a diameter in the range of 5 millimeter to 38 mm.

6. The method of claim 1, wherein the sphere body has a diameter in the range of 3 millimeters to 34 mm.

7. The method of claim 1, wherein the plurality of hooks and the plurality of latches comprise an alternating pattern.

8. The method of claim 7, wherein each hook of the plurality of hooks is separated from an adjacent latch of the plurality of latches by a radial distance in the range of 10° to 45°.

9. The method of claim 1, wherein each hook of the plurality of hooks has a length and the sphere body has a diameter, wherein the ratio of the length to the diameter is in the range of 0.1 to 3.5.

10. The method of claim 1, wherein each latch of the plurality of latches has a length and the sphere body has a diameter, wherein the ratio of the length to the diameter is in the range of 0.1 to 3.5.

11. The method of claim 1, wherein introducing the altered carrier fluid into the wellbore comprises pumping the altered carrier fluid through a drill bit.

12. The method of claim 1, wherein introducing the altered carrier fluid into the wellbore comprises using a bypass system.

13. The method of claim 1, wherein introducing the altered carrier fluid into the wellbore comprises introducing the altered carrier fluid into the wellbore using an open-ended drill pipe.

* * * * *